April 19, 1927. 1,624,967
G. NICHOLS
AUTOMOBILE CHAIN TIGHTENER AND FASTENER
Filed May 21, 1926
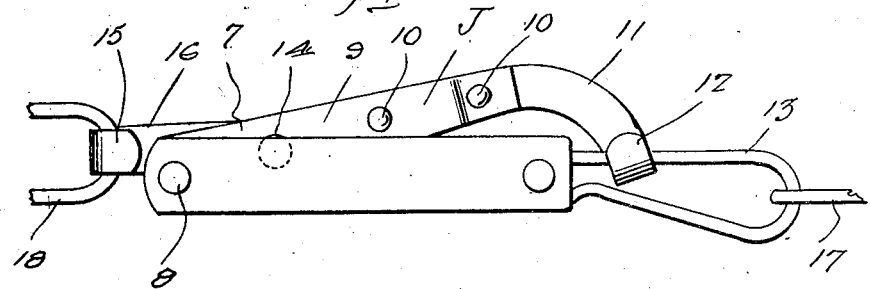
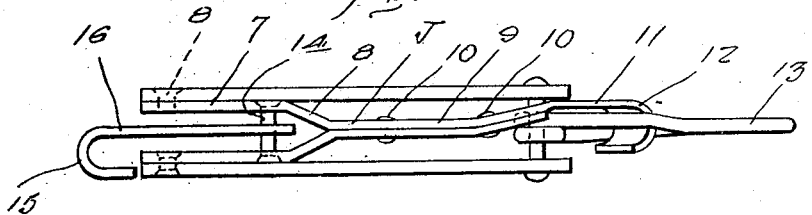
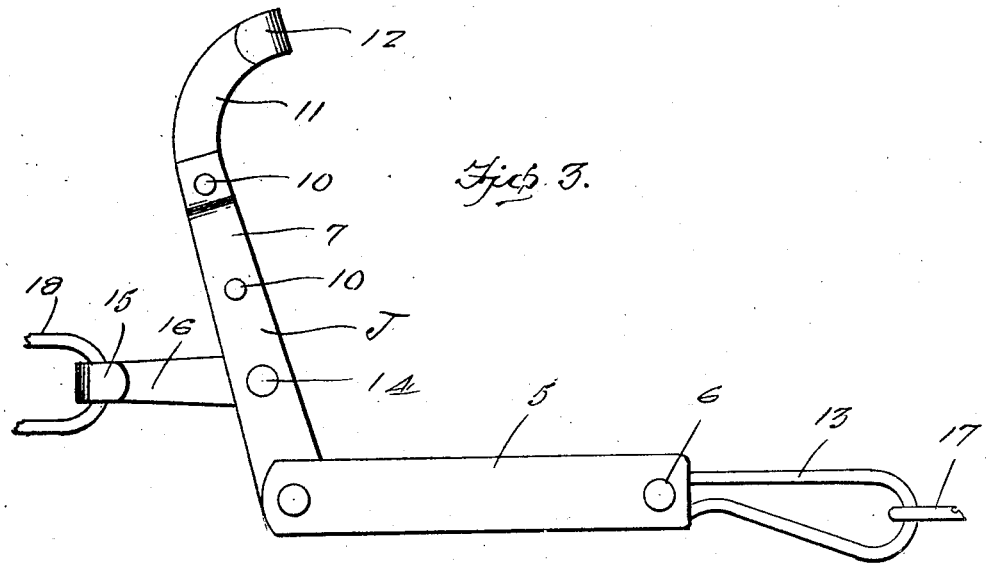
Inventor
G. Nichols
By Clarence A. O'Brien
Attorney Patented Apr. 19, 1927.

1,624,967

UNITED STATES PATENT OFFICE.

GUY NICHOLS, OF MOUNT HARRIS, COLORADO.

AUTOMOBILE CHAIN TIGHTENER AND FASTENER.

Application filed May 21, 1926. Serial No. 110,712.

The present invention appertains to a device which I term an automobile chain tightener and fastener and embodies means by which slack may be taken up in chains and the ends of chains connected together and the invention is especially useful in attaching and taking up slack in non-slide chains, applied to the wheels of automobiles, though it is to be understood that it is not limited to such particular use.

An important object and purpose of the invention is to provide a device of this character of economical and durable construction by means of which the tightening or fastening of all forms of non-skid chains for motor vehicle wheels may be readily effected.

Another very important object of the invention resides in the provision of a device of this nature which is exceedingly simple in its construction, easy to manipulate, efficient and reliable in use, not likely to easily become out of order, compact, and otherwise well adapted to the purpose for which it is designed.

A further object of the invention consists in novel features of construction by means of which after the tightening or fastening of the chains has been effected, the device is locked in position in a positive manner so that it cannot readily become disengaged.

With the above and numerous other objects in view as will appear as the description proceeds, the invention resides in certain novel features of construction and in the combination and arrangement of parts as will be hereinafter more fully described and claimed.

In the drawing:—

Figure 1 is a side elevation of the device as it appears after the tightening and fastening of the chain has been accomplished.

Fig. 2 is an elevation in edge, thereof, and

Fig. 3 is another side elevation thereof, showing the device before the tightening and fastening of the chain.

Like reference characters refer to like parts throughout the several views of the drawing.

In construction, the device includes two side bars 5 which are held in spaced parallel relation by a rivet 6 at one end thereof. The lever indicated generally by the letter J is pivotally engaged at one end with the other ends of the side bars 5 and swing therebetween. This letter J includes two side members, each of which comprises a body portion 7 pivoted as at 8 to one of the side bars 5. These body portions 7 merge into converging extensions 8 which in turn merge into arms 9 which are riveted together as at 10. The outer ends of these arms 9 are disposed at a slight angle and one of them is extended as at 11 terminating in a curved hook 12 which is adapted to engage a loop 13 pivotally engaged on the rivet or bolt 6. The bodies 7 are held in spaced parallel relation by a rivet 14.

A hook 15 is formed on the end of a shank 16 pivotally engaged on the rivet 14. This makes a very compact and convenient arrangement of the parts as will be quite apparent. The loop 13 is adapted to be engaged with one link 17 of a chain while the hook 15 is detachably engageable with the other end link 18 of said chain.

When the device is open as shown in Fig. 3, it will be seen that by swinging the lever to be positioned between the side bars 5 or to a closed position as shown in Figs. 1 and 2, that the hook 12 may be engaged with the loop 13, and thus the ends of the chain, 17, 18 are drawn toward each other, so that the slack may be taken therefrom and, of course, the engagement of the hook 12 with the loop 13 maintains the appliance in a locked position against accidental displacement because there is always a certain tension that tends to pull the ends apart, and thus this will have to be slightly overcome in order to unfasten the hook 12 from the loop 13.

From the foregoing, it will be apparent that I have produced a chain connector opener of a very simple construction, and one in which great force may be exerted if necessary to tighten the slack chain. This device is very useful in connecting the ends of chains, and at the same time taking up such slack as there may be therein, this being of special utility in applying non-skid chains to motor vehicles.

The construction consists of very few parts, and is very economical in manufacture, and is very durable in actual service. Particular stress is laid upon the fact that the device is exceedingly compact and convenient.

Various changes in the minor details of construction may be made without departing from the spirit of this invention as hereinafter claimed, and the present embodiment, therefore, has been shown and described merely by way of example, since in actual practice it attains the features of advantage enumerated as desirable in the statement of the invention and the above description.

Having thus described my invention, what I claim as new is:—

A device of the class described including, in combination, a body comprising a pair of bars, a bolt engaged at one adjacent end of the bars and holding said bars in spaced parallelism, a lever comprising a pair of rods having portions thereof in spaced parallelism and pivotally engaged with the other ends of the bars and adapted to swing between the bars, said straight portions merging at their free ends in converging extensions terminating in arms disposed in abutment with each other and slightly offset at their extremities, one of said arms terminating in a hook extension, a loop engaged on the bolt and engageable by the hook extension, a rivet holding the parallel portions of the rods in spaced relation adjacent the converging extensions, and a shank pivoted on said rivet and terminating in a hook.

In testimony whereof I affix my signature.

GUY NICHOLS.